United States Patent [19]
Buchner et al.

[11] Patent Number: 5,357,579
[45] Date of Patent: Oct. 18, 1994

[54] MULTI-LAYER ATMOSPHERIC FADING IN REAL-TIME COMPUTER IMAGE GENERATOR

[75] Inventors: Gregory C. Buchner, Sunnyvale, Calif.; William A. Kelly, Daytona Beach, Fla.

[73] Assignee: Martin Marietta Corporation, Philadelphia, Pa.

[21] Appl. No.: 91,380

[22] Filed: Jul. 15, 1993

Related U.S. Application Data

[63] Continuation-in-part of Ser. No. 754,494, Sep. 3, 1991, abandoned.

[51] Int. Cl.$^5$ .......................... G09B 9/08; G06F 15/00
[52] U.S. Cl. ........................................ 382/1; 395/126; 434/41
[58] Field of Search .............. 382/1; 395/118, 126, 395/127, 119; 345/9, 27, 112, 117; 434/36, 38, 41, 43, 44

[56] References Cited

U.S. PATENT DOCUMENTS

| | | | |
|---|---|---|---|
| 4,016,658 | 4/1977 | Porter et al. | 434/41 |
| 4,199,875 | 4/1980 | Barbarasch | 434/41 |
| 4,727,365 | 2/1988 | Bunker et al. | 345/112 |
| 4,862,391 | 8/1989 | Ohhashi | 364/522 |
| 4,866,637 | 9/1989 | Gonzalez-Lopez | 364/518 |
| 4,897,806 | 1/1990 | Cook et al. | 364/522 |

FOREIGN PATENT DOCUMENTS

| | | | |
|---|---|---|---|
| 1390357 | 4/1975 | United Kingdom | 434/41 |
| WO9118359 | 11/1991 | United Kingdom . | |

OTHER PUBLICATIONS

Computer Design, vol. 27, Aug. 1988, pp. 50–61 "Graphics System Designers Strive for Photorealism".
IEEE Computer Graphics and Applications, vol. 9, No. 4, Jul. 1989, pp. 43–55.
Asilomar Conference on Signals, Systems & Computers, 5 Nov. 1990, New York, pp. 399–403.

*Primary Examiner*—Leo H. Boudreau
*Attorney, Agent, or Firm*—Geoffrey H. Krauss

[57] ABSTRACT

The effect of multi-layer atmospheric scattering on the visibility F of each point P on a visible surface of each polygon in a display scene, in a computer image generation (CIG) system, is provided by determining the effective average reciprocal half-fading distance between viewpoint and the viewed point, knowing the altitudes at which each of the different scattering layers start and accounting for any transitional slopes therebetween. The total reduced visibility of that viewed point P is a function of the average reciprocal half-fading distance for that point and of the total range between the viewed point P and the viewpoint VP.

20 Claims, 3 Drawing Sheets

MULTI-LAYER ATMOSPHERIC FADING IN REAL-TIME COMPUTER IMAGE GENERATOR

This application is a continuation-in-part of U.S. application Ser. No. 07/754,494, filed Sep. 3, 1991, now abandoned.

The present invention relates to computer-controlled image generation and, more particularly, to novel methods and apparatus for generating the effects caused by light passing through a plurality of different atmospheric layers in the process of illuminating each point on the surface of the at least one polygon making up a scene to be displayed.

BACKGROUND OF INVENTION

Fading, as the term is used in the Computer Image Generation (CIG) arts, refers to the modification of the intrinsic feature color chromicity and intensity of an object towards a common haze or fading color, as a function of both the range between the object and observer and the density of the scatterers (e.g. fog droplets, dust particles and the like). The physical basis of this phenomena is illustrated, for a relatively simple case, in FIG. 1; the viewer 10, located at some viewpoint VP, is attempting to view a desired point $11p$ at the location P on a surface $11a$ from which illuminating light is reflected from an object 11. Light rays $12a$ emanate from a source 12, i.e. the sun, and then perhaps pass through a haze layer 14 (e.g. a layer of suspended moisture droplets) on the way to the object 11 being viewed. A portion $14s1$ of the light $12a$ incident on, and passing through, layer 14 is scattered by the layer and the light rays $12b$ actually illuminating object 11 are thus modified by the haze to have different chromicity and attenuated intensity. With the moisture particles acting as miniature prisms, the scattered light $14s1$ is refracted to create a multi-color effect the sum of which typically appears near-white. If the viewer 10 is so located as to cause the light rays $12c$ reflected from the viewed object 11 to pass through the layer 14 (or some other scattering layer), some of rays $12c$ are themselves scattered, as scattered light $14s2$, so that the light rays $12d$ actually reaching the viewpoint are even further modified in amplitude; the attenuation may, dependent upon the nature of the scattering layer or layers, be modified in chromicity as well as amplitude. Some of the scattered light $14s1/14s2$ may be returned in the direction of viewer 10, thereby creating an additional color source for the eye.

Since a portion of the light from the source is attenuated by the time it is received by the viewer, the direct contribution of the diffuse illumination of the object 11 will be diminished. Mimicking this effect is a critical capability for CIG systems (such as that using the Advanced Video Object Generator disclosed and claimed in U.S. Pat. No. 4,727,365, incorporated herein in its entirety by reference) and especially so when the CIG is used as part of a training system (e.g. a flight simulator and the like). Most critical is the ability to provide a realistic model of the effects of a multilayer atmospheric model, with the effects of each layer calculated at the pixel level. This capability will enable a system to be capable of training in true ground fog situations in which individual objects are accurately modeled, even though the objects exist partially in the haze and partly in a clearer layer. This capability is of particular importance in rotor-wing aircraft training and armor applications, as the majority of such training is at or near ground level, where fog greatly impacts the visibility of the environment. Accordingly, it is highly desirable to provide a multi-layer scattering capability to real-time CIG systems.

BRIEF SUMMARY OF THE INVENTION

In accordance with the invention, the effect of multi-layer atmospheric scattering on the visibility F of each point P on a visible surface of each of at least one polygon in a display scene is provided in computer image generation (CIG) systems, by modifying the color signal data (i.e. the chromicity and intensity) for each visible scenic point (or display pixel) by determining the effective average reciprocal half-fading distance between viewpoint and the viewed point, responsive to the altitudes at which each of the different scattering layers start and accounting for any transitional slopes therebetween. The total reduced visibility signal data will cause that viewed point P to be displayed responsive to a function of the average reciprocal half-fading distance for that point and of the total range R between the viewed point P and the viewpoint VP.

In a presently preferred method, the average reciprocal half-fading distance is determined by use of layer altitudes, so that the determined reciprocal distance is usable with any viewing of any viewed point P at its same altitude $Alt_p$, from any viewpoint VP at its same altitude $Alt_{VP}$. One form of apparatus for carrying out these determinations and calculations is described.

Accordingly, it is an object of the present invention to provide novel methods and apparatus for simulating, in computer image generation systems, the effects of multi-layer atmospheric scattering.

This and other objects of the present invention will become apparent to those skilled in the art upon reading the following detailed description of the invention, when considered in conjunction with the associated drawings.

DETAILED DESCRIPTION OF A PRESENTLY PREFERRED EMBODIMENT

Figure 1:
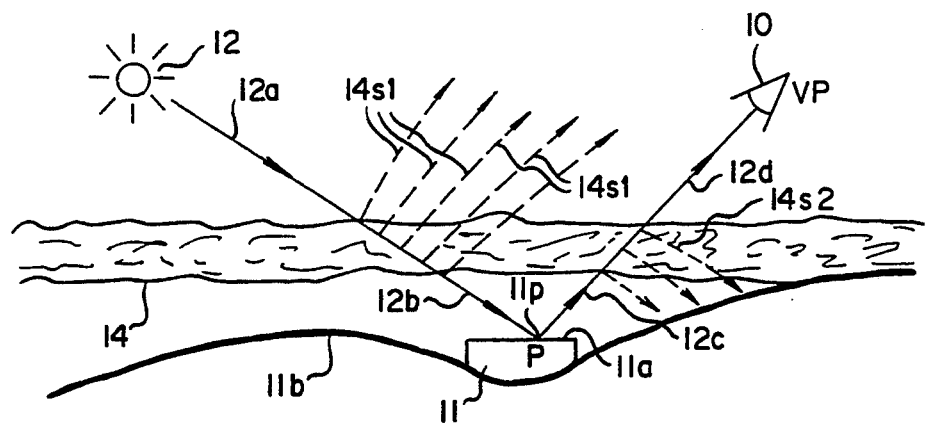
FIG. 1 is a schematic view of an illumination source, an object to be viewed and a viewer, with an intervening atmospheric layer, and illustrates the form of the problem considered by the present invention.
Figure 2:
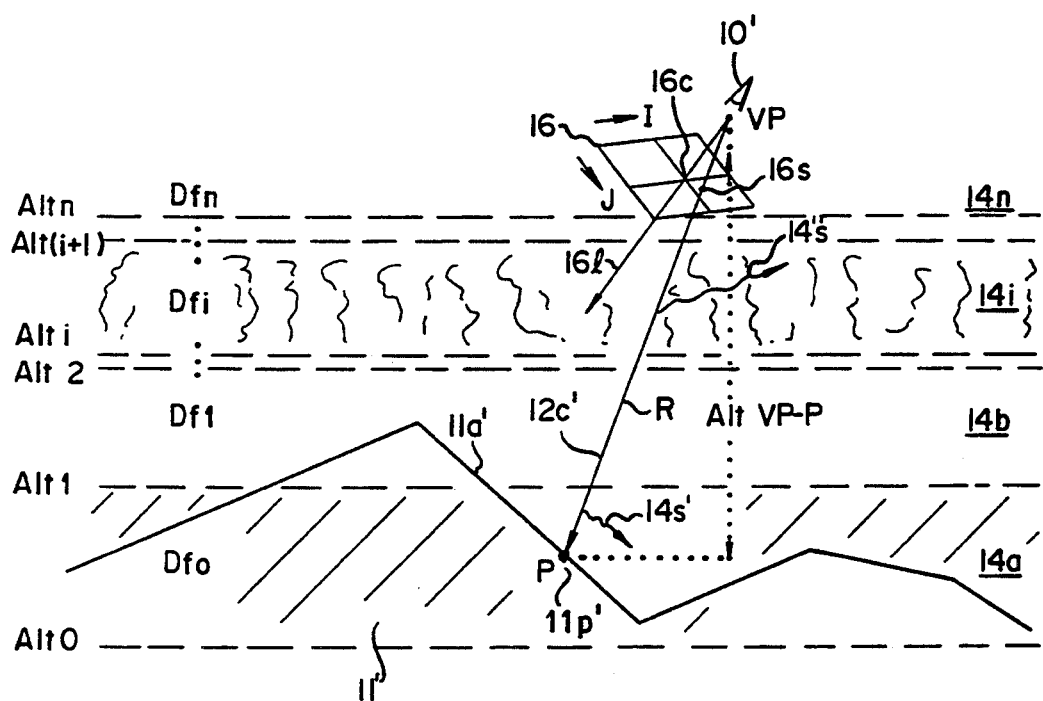
FIG. 2 is a schematic view of an observer and an observed point on an object, with a plurality of intervening atmospheric layers, and useful in the definition and appreciation of the method of the present invention.

Referring now to FIG. 2, the viewer 10' is at viewpoint VP and is observing light rays $12c'$ reflected from a particular point P at a viewed location $11p'$ on a surface $11a'$ of an object 11'. Point P is at a range distance R from viewpoint VP. By way of illustration only, the surface point $11p'$ is within a first atmospheric layer $14a$, which scatters some rays 14s' of the light reflected by the object surface 11a'. Layer 14a is overlaid by a second atmospheric layer 14b, which is overlaid by another layer and so forth, with viewer 10' being within a final-considered layer 14n. It will be seen that there may be other scatter layers above viewpoint VP and below viewed point 11p', but, because reflected light rays 12c' do not traverse these layers, such layers have no scatter effect on the light arriving at the viewer 10'. It will also be understood that each layer 14i, where $1 \leq i \leq n$, can be substantially clear (i.e with an attenuation of substantially zero) or may have any desired amount of attenuation $\alpha_i$, as long as that attenuation is different from the attenuation, in any function of amplitude and chromicity, of either adjacent layer 14(i−1) or 14(i+1).

The final color $C_f$ of a feature (e.g. a viewed point 11p') seen through a single haze layer, relative to the visibility F of that feature, is given by:

$$\text{final\_color} = \text{attenuated\_feature\_color} + \text{haze\_color\_due\_to\_scattering} \quad (1)$$

or $$C_f = F^*C_{feature} + (1-F)^*C_{haze} \quad (2)$$

where $C_{feature}$ is the color of the feature being processed, and $C_{haze}$ is the color of the haze. On a pixel basis, where $C_p$ is the color data signal (intensity and chromicity) of a particular display scene pixel, considered under perfectly clear visibility (F=1) conditions, and $C_h$ is the haze color signal data for that same pixel, then $$C_f = F^*C_p + C_h - F^*C_h. \quad (2a)$$

The visibility is typically generated by $$F = e^{-kR} \quad (3)$$

where k is a function of the fog density and R is the range from the viewpoint to the object. A convenient way to specify fog density k is to use the range at which the visibility F is equal to 0.5. This distance is labeled the half-fading distance Df. Equation (3) can then be written $$F = e^{-KR/Df} \quad (4)$$

where the constant k is replaced by a constant value K evaluated for the half-fading distance. Using the definition of Df, one can solve for K; thus, when range R=Df, F is equal to 0.5 and, therefore, $$0.5 = e^{-K} \quad (5)$$

or $$K = \ln(2) = 0.693 \quad (6)$$

Substituting for K in Equation (4) yields $$F = e^{-0.693R/Df} = e^{-KA} \quad (7)$$

where A is now defined as (R/Dr). The true range R is calculated to the feature being faded for each element the feature covers.

The implementation of fading in previous image generation systems used a single Df value for all surface polygons in a set artificially defined to include a number of somewhat similar polygons, e.g. the polygons defining a certain piece of terrain or those polygons belonging to a selected object model. This previous use of a single Df value limited the ability of a CIG system to accurately produce a layered atmospheric model for the simple reason that a class of features had to share a single Df value, even when the many elements of that class existed in more than one layer. A simple example of this drawback can be seen by reference to FIG. 2. Let a first layer 14a be of a dense ground fog, with a short half-fading distance value $Df_0$, and cover the lower half of the object 11' (a mountain), while the upper half of the mountain exists in a clear sky layer 14b, with a very long half-fading distance $Df_1$. A cloud layer 14i, with an intermediate half-fading distance $Df_i$, is also shown running through the clear sky above the mountain. In the prior art, only one Df value was available for the entire mountain, and a similar fading value had, of necessity, to be derived for the entire mountain, so that the distinct layer information was not used and was effectively lost, thus detracting from the realism of the computed image.

In accordance with our invention, the fading conditions indicated in FIG. 2 can be properly utilized in a CIG system by computation of an individual effective half-fading distance $Df_{eff}$ value for each separate processed point 11p' on the displayed (mountain) object 11', for all visible objects on the display screen 16; the screen has a center 16c disposed along the central viewing sightline 161, with that screen point 16s lying along the sightline 12'c to a particular point having screen coordinates $I_p, J_p$ relative to a chosen screen location (e.g. the upper left corner of the screen). The individual $Df_{eff}$ value is caused to be a function of the various layer densities $Df_i$ as the viewray 12'c passes through the various fog, haze and the like scatterer layers 14i to reach the polygon surface point 11p' then being processed.

The overall visibility value $F_p$ for the presently-considered point 11p' is the product of the visibilities $F_0, F_1, F_2, \ldots, F_i, \ldots, F_n$ of each layer of different density fog, haze and the like, encountered by the viewray 12'c between viewpoint VP and viewed point P:

$$F_p = F_0^*F_1^*F_2^* \ldots ^*F_i^* \ldots F_n \quad (8)$$

Using Equation (8) for an example having a viewray passing through only four layers (with respective visibilities $F_0, F_1, F_2$ and $F_3$), the visibility $F_p'$ along the viewray from the viewpoint VP to the point P is $$F_p' = F_0^*F_1^*F_2^*F_3 \quad (9)$$

Expanding Equation (9) yields $$F_p' = (e^{-KR0/Df0})(e^{-KR1/Df1})(e^{-KR2/Df2})(e^{-KR3/Df3}) \quad (10)$$

Since the sum of the ranges through each layer along the viewray equals the range from VP to P (i.e. $Rp = R0 + R1 + R2 + R3$), there exists a single effective Df value, denoted $Df_{eff}$, which yields $$e^{-K(Rp/Df_{eff})} = e^{-K((R0/Df0)+(R1/Df1)+(R2/Df2)+(R3/Df3))} \quad (11)$$

and $$R_p(1/Df_{eff}) = R_0(1/Df_0) + R_1(1/Df_1) + R_2(1/Df_2) + R_3(1/Df_3) \quad (12)$$

And therefore, $$1/Df_{eff} = [R_0(1/Df_0) + R_1(1/Df_1) + R_2(1/Df_2) + R_3(1/Df_3)]/R_p \quad (13)$$

Using simple ratios, it should be apparent that $1/Df_{eff}$ can be computed using altitude (Alt) instead of range (R); specifically, we want to use $Alt_{VP\text{-}P}$ as a substitute for $R_{VP\text{-}P}$. This will greatly simplify the remaining calculations since the vertical distance through a given layer will remain constant while the angle of the viewray can change. In order to calculate the effective reciprocal half-fading distance ($1/Df_{eff}$), the altitude $Alt_p$ of the point being processed must be determined. A simple approach is to generate an equation which describes altitude $Alt_p$ as a function of the range (R) and the screen position ($I_p, J_p$) of the point 16s through which passes the viewray 12c' for that particular point 11p' on the viewed polygon surface 11a'. This altitude $Alt_p$ can be expressed as $$Alt_p = Alt_{VP} + Z\overline{N}_f\overline{V}_j \quad (14)$$

where $\overline{N}_t$ is the unit gravity vector, $\overline{V}_j$ is a vector through the pixel ($I_p, J_p$), and Z is a first function of the screen position, which, for the I/J screen designation system, is $$Z = C_4 + C_5 I_p + C_6 J_p \quad (15)$$

where $C_4$, $C_5$ and $C_6$ are computed, in well-known manner, for the specific polygon. This produces $Alt_p$ as a function of the ($I_p, J_p$) coordinates, or $$Alt_p = Alt_{VP} + ((C_i + C_2 I_p + C_3 J_p)/(C_4 + C_5 I_p C_6 J_p)) \quad (16)$$

where $C_1$, $C_2$ and $C_3$ are also computed for the specific polygon. Equation (16) can be combined to obtain another (I,J) function, in the form $$Alt_p = ((C_1' + C_2' I_p + C_3' J_p)/(C_4 + C_5 I_p + C_6 J_p)). \quad (17)$$

Now, having found $Alt_p = f(I_p, J_p)$, the $1/Df_{eff}$ for the change of altitude must be found. The atmospheric layer information can be defined in terms of density per unit altitude. A cumulative density can be calculated by averaging the unit densities across the change in altitude from the viewpoint altitude to the altitude of the point P being faded. Many options exist for calculating the cumulative fog density. One particular implementation is to generate this value on-the-fly for each point 11p' being processed. This can be accomplished by storing the start altitude Alt $L_i$ for each atmospheric layer, the initial unit fog density for that layer, and a slope ($m_i$) describing the rate of change of the density of the i-th layer per unit altitude. This provides the ability to create uniform density areas and transition layers between such layers. A cumulative density from altitude=0 is stored for the starting altitude of each layer. Additional signal data is stored to describe the altitude and cumulative density at the viewpoint.

For each point 11p' on each polygon 11a' processed in the scene, a processor can be used to calculate information which is then utilized as the input to a series of comparators for determination of those atmospheric layers which are totally below the particular point 11p' and also of that layer within which the point is contained. If the point is within a uniform density layer (non-transition), the processor calculates the cumulative density to the point as $$(1/Df_{eff\_cumm\_p}) = (1/Df_{cumm\_l}) + (Alt_p - Alt_l)*(1/Df_l) \quad (18)$$

where l is the current layer designation. If the point falls within a transitional-density layer, the cumulative density to the point is $$(1Df_{eff\_cumm\_p}) = (1Df_{cumm\_l}) + (Alt_p - Alt_l)*(1/Df_l) + (Alt_p - Alt_l)^{2}*(\tfrac{1}{2})(1/Df_m)$$

where m is the slope $m_i$ of the particular i-th layer. This result, which allows the cumulative density from ground zero to the viewed point to be processed, can be generalized as $(1/Df_{eff\_cumm\_p}) = (1/Df_{cumm\_l}) + (Alt_p - Alt_l)*(1/Df_l) + S*(Alt_p - Alt_l)^2*(1/2)(1/Df_m)$, where S is respectively 0 or 1 for respective non-transitional and transitional layer densities. The change in altitude from the viewpoint to the point being processed is simply $$Alt_{VP \to P} = |Alt_{VP} - Alt_p|. \quad (20)$$

The cumulative density across the altitude change is $$(1/Df_{eff\_cumm}) = |(1/Df_{eff\_cumm\_VP}) - (1/Df_{eff\_cumm\_P})| \quad (21)$$

The effective average density, or $1/Df_{eff}$, is found by $$(1/Df_{eff}) = (1/Df_{eff\_cumm})/(Alt_{VP \to P}) \quad (22)$$

One special case exists in which the change in altitude is 0. For this case the $1/Df_{eff}$ is the $1/Df$ at the viewpoint altitude. The fading for the point can now be found using Equation (7); the effective average half-fading reciprocal distance $1/Df_{eff}$ is multiplied by range R, with the result being used as the input to an exponential function generator. This function can be generated as a memory look up table (TLU) or by a piecewise approximation.

Figure 3:
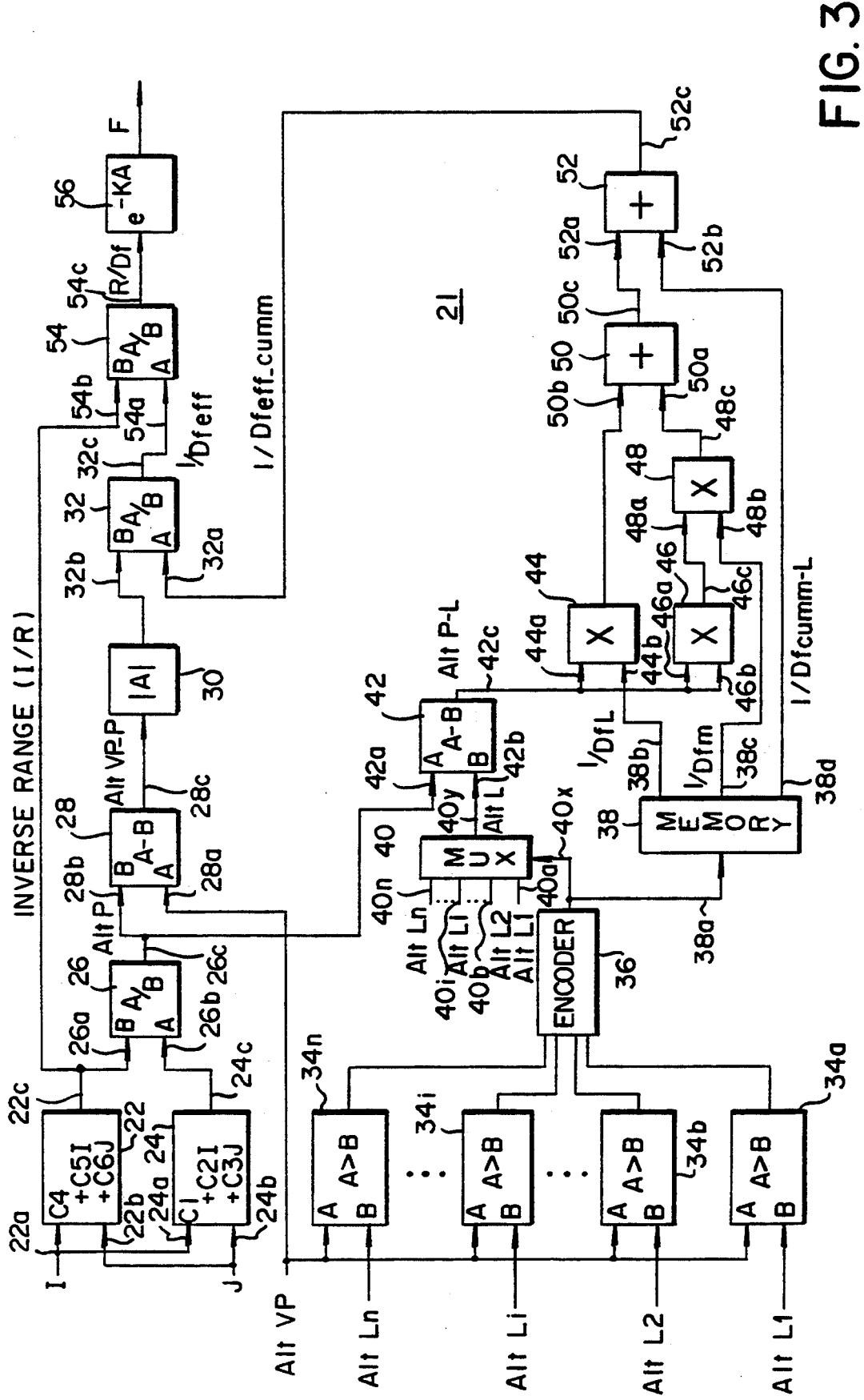
FIG. 3 is a schematic block diagram of apparatus for generating the visibility factor F in a subprocessor used to provide multi-layer scattering effects in a CIG.
Figure 4:
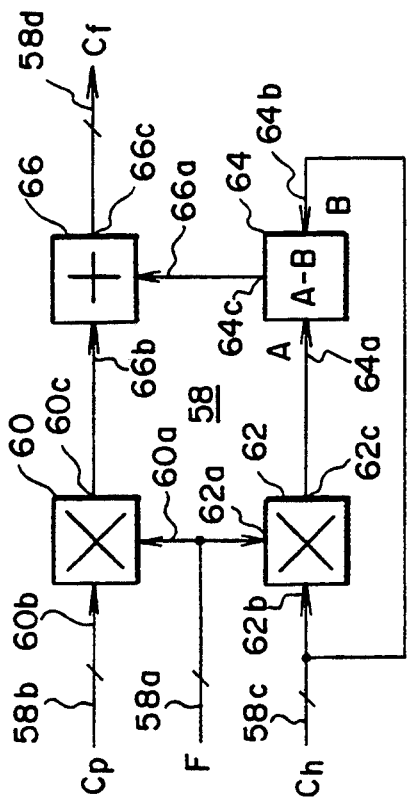
FIG. 4 is a schematic block diagram of apparatus for generating the haze-affected color data signal, utilizing the visibility factor F, in a subprocessor used to provide multi-layer scattering effects in a CIG.
Figure 5:
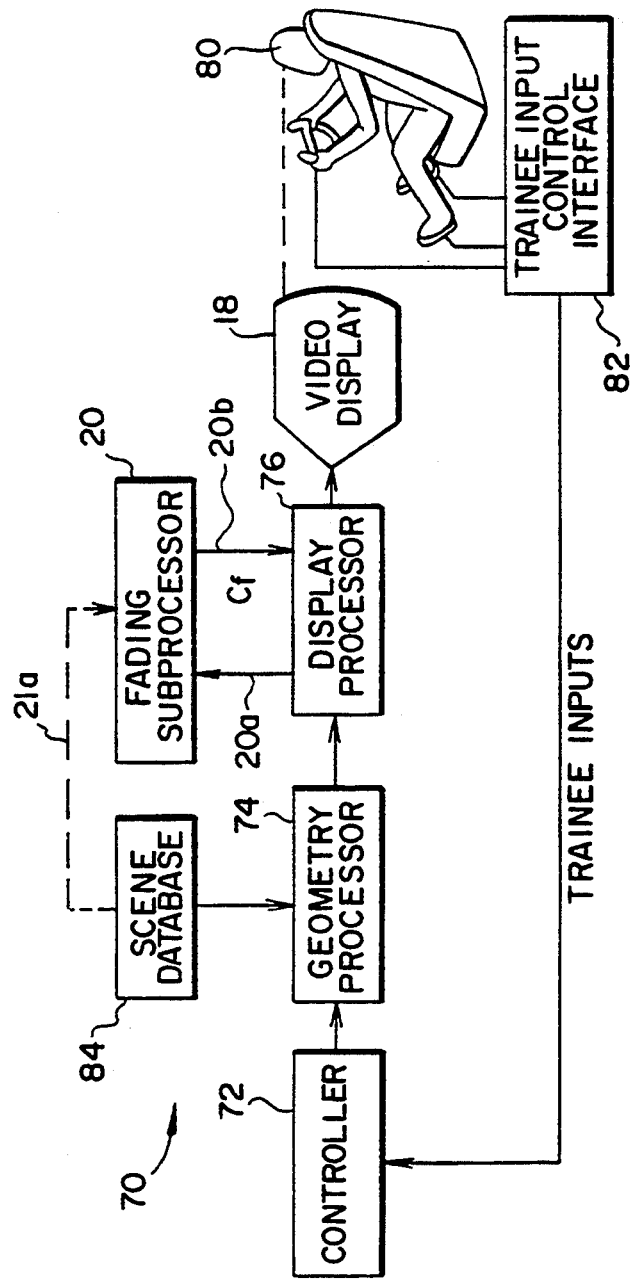
FIG. 5 is a schematic block diagram of a computerized image generator using a fading subprocessor in accordance with the principles of the present invention.

Referring now to FIGS. 3–5, one presently preferred embodiment of a fading subprocessor 20 (FIG. 5) is shown for use in the display processor of a CIG system configured as in the abovereferenced patent. Fading Subprocessor 20 receives viewpoint VP and viewed point P information at an input 20a and fading layer data signals at an input 21a. and provides the faded color $C_f$ information at an output 20b; the subprocessor includes a visibility data signal generating means 21 (FIG. 3), which receives atmospheric layer information (e.g. level Alt L1 to Alt Ln data signals) at inputs 21a (connected to a system database, directly or indirectly through a display processor, of which means 20 is a part), and a subsequent color signal data modification means 58 (FIG. 4).

The visibility data signal generator means 21 has a first, or input, means including ports 22a/b and 24a/b for receiving I and J data signals, port 28a for receiving the $Alt_{VP}$ data signal, and ports 40a–40n for receiving the plurality n of layer lower altitude data signals. The $I_p$ and $J_p$ pixel location data signals for the screen point 16s, corresponding to the viewray 12'c from the viewpoint VP to the particular polygon surface point 11p' for which fading data is then being calculated, are respectively input (say, from the associated display processor) to the respective first inputs 22a/24a and second inputs 22b/24b of respective first and second function generators 22/24, which respectively provide the $(C_4+C_5I_p+C_6J_p)$ data signal and the $(C_1+C_2I_p+C_3J_p)$ data signal at the respective outputs 22c/24c. Output 22c is coupled to a second B input 26a of a first divisor means 26, which has a first A input receiving the data signal from output 24c. The resulting A/B data signal at an output 26c is thus the viewed point altitude $Alt_p$ as calculated using Equation (17). This altitude data signal is provided to a second B input 28b of a subtractor means 28, having a first A input 28a receiving the viewpoint altitude $Alt_{VP}$ data signal; the output 28c has an A-B data signal, which is the desired $Alt_{VP \to P}$ information. An absolute-value-taking means 30 processes this signal data and applies $|Alt_{VP \to P}|$ to a second B input 32b of a second division means 32, having a first A input 32a receiving the $(1/D_{eff\_cumm})$ signal data. The A/B data signal at output 32c is the required effective average reciprocal half-fading distance $(1/Df_{eff})$ signal data.

Each of a plurality N of signal data comparators 34a-34n has a first A input receiving the $Alt_{VP}$ data signal and a second B input individually receiving the signal data defining the lower altitude $Alt\ L_i$ of the associated i-th layer; note that an altitude $Alt\ L_0$ is not used, as the lower altitude of the zero-th layer is defined as zero altitude. The associated comparator 34i output is normally at a first logic level if $A \leq B$, i.e. the actual altitude is not greater than the lower layer altitude, and is only enabled to a second logic level if $A > B$, i.e. if the viewpoint altitude is above the layer lower altitude. The comparator 34i outputs will be successively enabled, starting with the output of the first comparator 34a, if the viewpoint has an altitude greater than the lower first layer altitude (i.e. is above the bottom, or zero-th, layer), and successively increasing as the viewpoint altitude increases and enters, or passes above, a next-higher layer. Thus, if the viewpoint VP is in the i-th layer, all of the outputs of the first, second, . . . ,(i-1)-st and i-th comparator outputs are enabled to the second logic level, while the (i-1)-st through n-th outputs remain at the first selected logic level. The number of sequential levels is encoded, as a datum of value I, by the encoder means 36 operating on the I enabled comparator output signals. The I datum is coupled to an address input 38a of a memory means 38 for use in addressing a set of data signals stored at a corresponding location in the memory, and also as an input-select control signal at a control input 40x of an N-input multiplexing (MUX) means 40. The individual layer lower altitude $Alt\ L_i$ data signals for each i-th layer, is coupled to the associated 40i input of MUX means 40, so that signal data setting the altitude $Alt\ L_i$ of the present layer in which the viewpoint VP is located, is provided at the MUX means output 40y. This data signal is coupled to a second B input of another subtractor means 42, having a first A data input 42a receiving the Alt P data signal from the first divider means output 26c. The signal at the (A-B) output 42c contains the Alt(P-L) data signal, and is provided to a first input 44a of a first multiplier means 44 and to both inputs 46a/46b of a second multiplier, or squarer, means 46. The second input 44b of the first multiplier receives $1/Df_l$ signal data from a first output 38b taken from the addressed location of memory 38, and provides product data signals from its output 46c to a first input 48a of a third multiplier means 48. Simultaneously, a third multiplier second input 48b receives $1/Df_m$ slope data signals from a second memory means output 38c. The third multiplier output 48c provides signal data to a first input 50a of a first adder means 50, having a second input 50b receiving the $Alt(P-L)^2$ data signal from the first multiplier output 44c. The first adder output 50c provides signal data to a first input 52a of a second adder means, receiving $1/Df_{cumm-L}$ data signals from a third memory output 38d. The second adder output 52c provides the $1/Df_{ef\_cumm}$ data signal needed at the divider first input 32a.

The $1/Df_{eff}$ data signal at output 32c is coupled to a first input 54a of a final divider means 54, having its second B input receiving inverse range (1/R) signal data, which is the $(C_4+C_5I+C_6J)$ data signal from the first function generator output 22c. The data signal at the final divider means output 54c is the R/Df quotient, which is then used as the A input data signal to an exponentiator means 56 and is operated upon, responsive to a fixed K value set into means 56, to generate the $e^{-KA}$ output data signal forming the F visibility signal data output from circuit 21. Circuit 21 is thus separately used for each display scene pixel or each visible point P on each surface of each polygon viewable in the total display, to determine the scattering visibility of that pixel/point.

The visibility F signal data thus generated is provided to the F data input 58a of the color signal data modification means 58 (FIG. 4), for connection to a first input 60a of a first data signal multiplier means 60 which also receives at its second input 60b the pixel/point color data $C_p$ signal from the display processor, via modification means input 58b. The visibility data F signal is also provided to a first input 62a of another data signal multiplier means 60, which receives at its second input 62b the pixel/point haze data $C_h$ signal, directly from the system database memory or indirectly from the display processor, at modification means input 58c. The multiplier output 62c is connected to the subtractive B input 64a of a subtractor (A-B) means 64, which receives the $C_h$ data signal at its first, or A, input 64b. The means output 64c has the $(1-F)*C_h$ data signal, for connection to a first input 66a of an adder means 66, receiving the $F*C_p$ signal data signal at its second input 66b. The adder means output 66c is connected to the modification means output 58d, for supplying the haze-modified color data $C_f$ signal for display of the pixel chromicity/intensity at that point P then being processed.

Referring now to FIG. 5, the subprocessor 20 is used in a conventional CIG system 70 (see, e.g., U.S. Pat. No. 4,811,245, also incorporated by reference in its entirety) of the type having a Controller unit 72 in series with a Geometry Processor unit 74 and a Display Processor unit 76, for generating the video information displayed on a Video Display means 78, and visible to a user 80. The user operates controllers, which are part of a trainee input control interface means 82, for providing trainee input data signals to controller means 72. The geometry processor 74 obtains descriptions of scenic objects from an associated scenic database means 84, and rotates these potentially-visible 3D objects into display coordinates using a rotation matrix calculated by the controller means, responsive to the most recent vehicle orientation obtained from the input controls. The geometry processor provides visible object face polygon information to each of at least one display processors connected thereto, which display processors determine the color and intensity of each display pixel.

While one specific implementation of apparatus for carrying out our novel multi-layer fading method has been described in some detail herein, those skilled in the art will now understand that many variations and modifications can be made whilst remaining within the spirit of our invention. Accordingly, we intend to be limited only by the scope of the appending claims and not by way of details and instrumentalities set forth herein by way of embodimental description.

What we claim is:

1. A method for modifying the color (chromicity and intensity) of light to be emitted at each pixel of a display scene in a computer image generation (CIG) system, responsive to a fading effect of scattering through a plurality n of different atmospheric layers on the visibility $F_p$ from a viewpoint VP of each separate one of a multiplicity of viewed points P on each visible polygon surface in that scene, comprising the steps of:

(a) providing (1) a signal containing at least altitude $Alt_{VP}$ data for the viewpoint VP for the present scene to be displayed, (2) a separate data signal representing a location of each of the plurality of viewed points P of the present scene, and (3) a set of other data signals, each representing a beginning altitude $Alt\ L_i$, for $1 \leq i \leq n$, for the i-th one of the plurality n of scattering layers;

(b) providing an associated different one of a multiplicity of input data signals $C_p$ for the color of each separate point P in the present scene;

(c) separately generating, for each point P of the scene, an inverse range data signal, responsive to a viewscreen data signal, obtained from the VP and P data signals, of a viewscreen location $(I_p, J_p)$ of a viewray from the viewpoint VP to that viewed point P;

(d) generating another data signal representing an altitude $Alt_p$ of the viewed point P;

(e) generating, from the $Alt_p$ and $Alt_{VP}$ data signals and the set of $Alt\ L_i$ data signals, an effective cumulative layer half-fading reciprocal distance $(1/Df_{eff\_cumm})$ data signal;

(f) generating a data signal representing a total diminished visibility $F_p$ of point P from viewpoint VP through all of the intervening scattering layers, responsive to selected ones of the inverse range, viewed point altitude, viewpoint altitude and effective cumulative layer half-fading reciprocal distance data signals; and (g) modifying the received data signals $C_p$, responsive to the point P diminished visibility data signal $F_p$, to an output data signal $C_f$ used to determine the color and intensity of the visible light emitted by at least one display pixel associated with each viewed point P of the scene then being displayed.

2. The method of claim 1, wherein step (f) includes the steps of: generating a data signal for an effective half-fading reciprocal distance $(1/Df_{eff})$ from the $Alt_p$, $Alt_{VP}$ and $(1/Df_{eff\_cumm})$ data signals; generating (R/Df) data signals as a function of the inverse range and $(1/Df_{eff})$ data signals; and generating the diminished visibility function $F_p$ data signal by processing of the resulting (R/Df) data signals.

3. The method of claim 2, wherein step (f) further includes the steps of: generating a data signal from an absolute difference in the $Alt_{VP}$ and $Alt_p$ data signals; and generating the $(1/Df_{eff})$ data signals as a function of the $(1/Df_{eff\_cumm})$ data signals and the absolute altitude difference data signals.

4. The method of claim 1, wherein step (c) includes the step of generating the inverse range data signal as a preselected function $f1 = (C_4 + C_5 I_p + C_6 J_p)$, where $C_4$, $C_5$ and $C_6$ are predetermined constants of the viewscreen data signal for that point.

5. The method of claim 4, wherein step (d) includes the steps of: generating a data signal for another preselected function $f2 = (C_1 + C_2 I_p + C_3 J_p)$, where $C_1$, $C_2$ and $C_3$ are other predetermined constants, of the viewscreen data signal; and generating the $Alt_p$ data signal as a quotient of the f1 and f2 data signals.

6. The method of claim 1, wherein step (e) includes the steps of: determining, for each layer L between the altitude $Alt_p$ of point P and the altitude $Alt_{VP}$ of viewpoint VP, a data signal responsive to a difference in altitude of that layer L from the point P and at least one layer half-fading distance characteristic; and then generating the $(1/Df_{eff\_cumm})$ data signals from the determined layer altitude difference data signals.

7. The method of claim 6, wherein the difference-determining step includes the steps of: comparing the present viewpoint altitude $Alt_{VP}$ to the lower altitude $Alt\ L_i$ of each associated layer; and providing a data signal, responsive to the comparisons, indicating the highest layer in which the viewpoint is contained.

8. The method of claim 7, wherein the difference-determining step further includes the step of providing $Alt\ L_i$ signal data by selecting an altitude data signal for the lower altitude of the highest-contained layer.

9. The method of claim 8, wherein step (c) also includes the step of storing signal data for at least one intermediate layer for each layer lying between the highest-contained layer and the layer containing the point P.

10. The method of claim 6, wherein the then-generating step includes the step of generating the total effective fading data signal responsive to a function $(1/Df_{eff\_cumm\_p}) = (1/Df_{cumm\_l}) + (Alt_p - Alt_l)*(1/Df_l) + S*(Alt_p - Alt_l)^2*(1/2)(1/Df_m)$, where $S=0$ if the viewpoint is not in a transitional-density layer and $S=1$ if the viewpoint is in a transitional-density layer.

11. Apparatus for modifying the color (chromicity and intensity) of light to be emitted at each pixel of a display scene in a computer image generation (CIG) system, responsive to a fading effect of scattering through a plurality n of different atmospheric layers on the visibility $F_p$ from a viewpoint VP of each separate one of a multiplicity of viewed points P on each visible polygon surface in that scene, comprising:

first means for receiving (1) a signal containing at least altitude $Alt_{VP}$ data for the viewpoint VP for the present scene to be displayed, (2) a separate data signal representing a location of each of the plurality of viewed points P of the present scene, and (3) a set of other data signals, each representing a beginning altitude $Alt\ L_i$, for $1 \leq i \leq n$, for each i-th one of the plurality n of scattering layers;

second means for receiving an associated different one of a multiplicity of input data signal $C_p$ for the color of each separate point P in the present scene;

third means for separately generating, for each point P of the scene, an inverse range data signal, responsive to a viewscreen data signal, obtained from the VP and P data signals, of a viewscreen location $(I_p, J_p)$ of a viewray from the viewpoint VP to that viewed point P;

fourth means for generating another data signal representing an altitude $Alt_p$ of the viewed point P;

fifth means for generating, from the $Alt_p$ and $Alt_{VP}$ data signals and the set of Alt $L_i$ data signals, an effective cumulative layer half-fading reciprocal distance $(1/Df_{eff\_cumm})$ data signal;

sixth means for generating a data signal representing a total diminished visibility $F_p$ of point P from viewpoint VP through all of the intervening scattering layers, responsive to selected ones of the inverse range, viewed point altitude, viewpoint altitude and effective cumulative layer half-fading reciprocal distance data signals; and seventh means for modifying the second means data signals $C_p$, responsive to the point P diminished visibility data signal $F_p$ from the sixth means, to an output data signal $C_f$ used to determine the color and intensity of the visible light emitted by at least one display pixel associated with each viewed point P of the scene then being displayed.

12. The apparatus of claim 11, wherein the sixth means includes: ninth means, responsive to the $Alt_p$, $Alt_{VP}$ and $(1/Df_{eff\_cumm})$ data signals, for generating an effective half-fading reciprocal distance $(1/Df_{eff})$ data signal; means for generating (R/Df) data signals as a function of the inverse range and $(1/Df_{eff})$ data signals; and means for generating the diminished visibility function $F_p$ data signal responsive to the resulting (R/Df) data signal.

13. The apparatus of claim 12, wherein said ninth means includes: means for generating a data signal responsive to an absolute difference in the $Alt_{VP}$ and $Alt_p$ data signals; and means for generating the $(1/Df_{eff})$ data signal as a function of the $(1/Df_{eff\_cumm})$ data signal and the absolute altitude difference data signal.

14. The apparatus of claim 11, wherein said third means includes means for generating the inverse range data signal as a preselected function $f1=(C_4+C_5I_p+C_6J_p)$, where $C_4$, $C_5$ and $C_6$ are predetermined constants, of the viewscreen data signals for that point.

15. The apparatus of claim 14, wherein said fourth means includes: means for generating another preselected function $f2=(C_1+C_2I_p+C_3J_p)$ data signal, where $C_1$, $C_2$ and $C_3$ are other predetermined constants, from the viewscreen data signals for that point; and means for generating the $Alt_p$ data signal as a quotient of the f1 and f2 data signals.

16. The apparatus of claim 11, wherein said fifth means includes: means for determining, for each layer L between the altitude $Alt_p$ of point P and the altitude $Alt_{VP}$ of viewpoint VP, a data signal responsive to a difference in altitude of that layer L from the point P and at least one layer half-fading distance characteristic; and means for then generating the $(1/Df_{eff\_cumm})$ data signals from the determined layer altitude difference data signals.

17. The apparatus of claim 16, wherein the difference-determining means includes: a plurality n of means each for comparing the present viewpoint altitude $Alt_{VP}$ to the lower altitude Alt $L_i$ of each associated layer; and means, responsive to the plurality of comparing means, for indicating the highest layer in which the viewpoint is contained.

18. The apparatus of claim 17, wherein the difference-determining means further includes means for providing Alt $L_i$ signal data by selecting an altitude data signal for the lower altitude of the highest-contained layer.

19. The apparatus of claim 18, wherein said fifth means also includes a memory for storing signal data for at least one intermediate layer for each layer lying between the highest-contained layer and the layer containing the point P.

20. The apparatus of claim 16, wherein said then-generating means includes means for generating the total effective fading data signal responsive to a function $(1/Df_{eff\_cumm\_p}) = (1/Df_{cumm\_i}) + (Alt_p - Alt_l)*(1/Df_l) + S*(Alt_p - Alt_l)^2*(1/2)(1Df_m)$, where $S=0$ if the viewpoint is not in a transitional-density layer and $S=1$ if the viewpoint is in a transitional-density layer.

* * * * *